United States Patent [19]

Austin

[11] 4,206,192
[45] Jun. 3, 1980

[54] METHOD FOR PRODUCING CARBON BLACK

[75] Inventor: Oliver K. Austin, Bartlesville, Okla.

[73] Assignee: Phillips Petroleum Company, Bartlesville, Okla.

[21] Appl. No.: 848,251

[22] Filed: Nov. 3, 1977

[51] Int. Cl.² .......................... C01B 31/02; C09C 1/48
[52] U.S. Cl. ...................................... 423/455; 423/450
[58] Field of Search ...................... 423/450, 455, 456; 23/259.5; 422/150

[56] References Cited

U.S. PATENT DOCUMENTS

| 3,390,960 | 7/1968 | Forseth | 423/456 |
| 4,069,298 | 1/1978 | Hunt | 423/456 |

FOREIGN PATENT DOCUMENTS

| 1290527 | 3/1962 | France . | |
| 991483 | 5/1963 | United Kingdom | 423/450 |
| 963526 | 7/1964 | United Kingdom | 423/450 |
| 1150362 | 4/1969 | United Kingdom | 423/450 |

Primary Examiner—O. R. Vertiz
Assistant Examiner—Gregory A. Heller

[57] ABSTRACT

In a carbon black reactor having at least one combustion zone opening into a reaction zone, each combustion zone has opening thereinto, in a generally tangential direction, quench fluid inlet means operably connected to a source of quench fluid. The quench fluid is introduced into the combustion zone to control the temperature of the combustion gases to a desired temperature before the combustion gases are introduced into the reaction zone. Control means is provided for controlling the quench fluid input in response to the temperature of the combustion gases.

14 Claims, 3 Drawing Figures

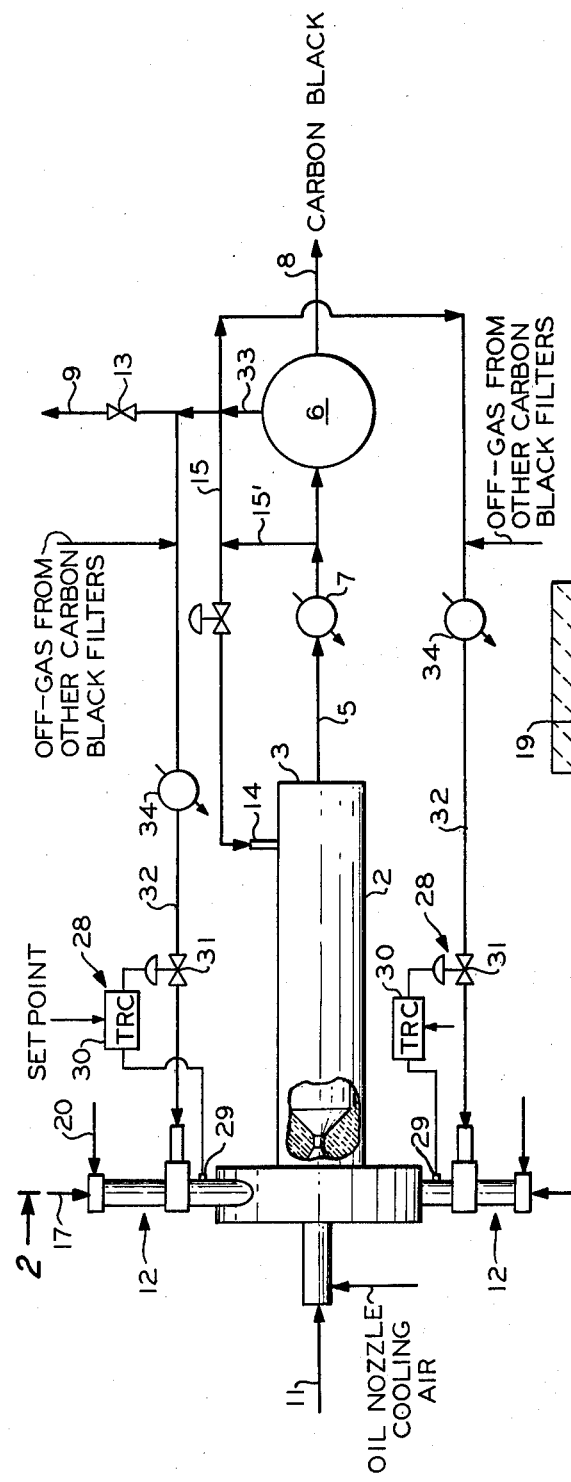
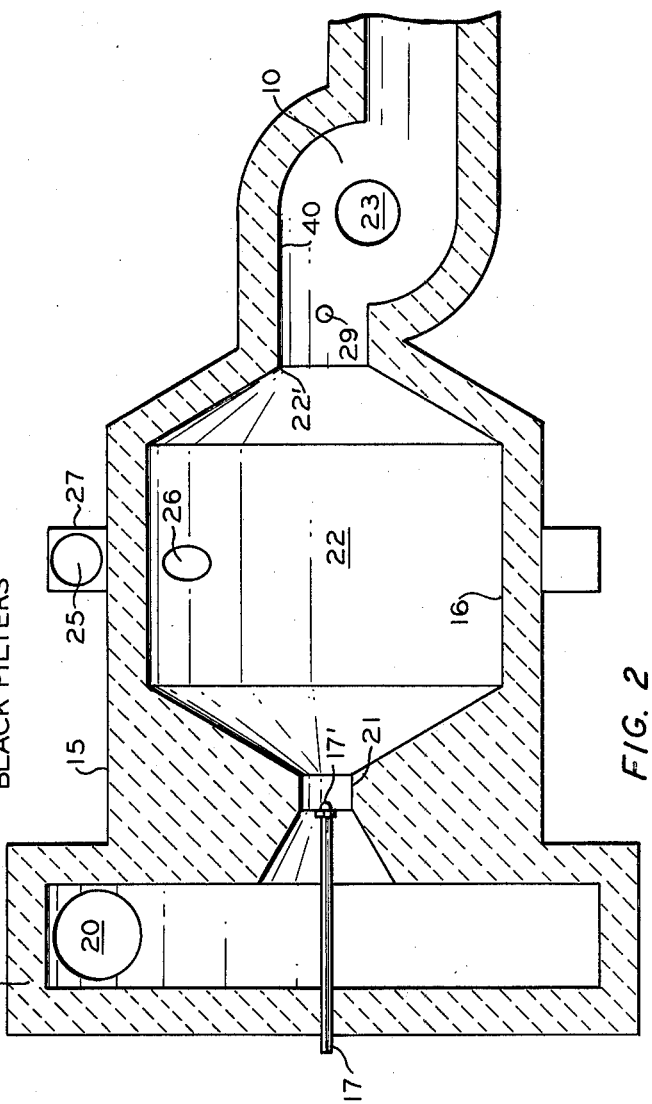

METHOD FOR PRODUCING CARBON BLACK

The present invention relates to a method and apparatus for producing carbon black in which quench fluid is introduced into a combustion zone for controlling the temperature of hot combustion gases before the gases are introduced into the reaction zone.

When combusting a combustible fuel, with about a stoichiometric amount of oxygen (e.g., as air), in a combustion zone before introduction of the resulting combustion gases into the carbon black reaction zone, it has been found that the temperature of the combustion gases can exceed a temperature which will damage the refractory lining of the combustion zone. Also, off-gas from the reactor filter system effluent contains combustible materials generally in minor quantities. The off-gas is available for use to provide some heat to the combustion gases by their being burned in the combustion zone. Thereby if the off-gas is used as the quench fluid to lower the temperature of the combustion gases, the combustible portion of the off-gas can supply portions of the heat required for the pyrolysis of the make-hydrocarbon.

One of the problems with operation of carbon black reactors is the control of the temperature of the hot combustion gases used to pyrolyze the make-hydrocarbon to carbon black. The hot combustion gases can either be formed in a combustion zone within the reactor or in an external combustion zone and then introduced into the reaction zone as hot combustion gases. It is desirable to have the hot combustion gases at a temperature sufficiently high to effect efficient pyrolysis of the make-hydrocarbon and produce carbon black while not having the temperature excessively high so as to cause damage to the refractory lining of the combustion zone and/or reaction zone.

Another problem encountered in producing carbon black by pyrolysis of a make hydrocarbon is that of control of the combustion of a combustible fuel with an oxygen-containing gas, such as air. Combustion should be conducted such that there is no or minimal oxygen left when the combustion gases contact the make-hydrocarbon. If excess oxygen is provided for combustion, then the excess oxygen will oxidize a portion of the make-hydrocarbon and thereby reduce the yield of carbon black. Since make-hydrocarbons usually have a higher price than the combustible fuel, it is highly desirable to have the combustible fuel supply all the required pyrolysis heat and it is also desirable to eliminate or minimize oxidation of the make-hydrocarbon. Therefore, it is desired that the combustible fuel and oxygen to support combustion of the fuel be in substantially stoichiometric proportions.

An object of the present invention is to provide an apparatus for producing carbon black which has means for controlling the temperature of the hot combustion gases introduced into the reaction zone. Another object is to provide an apparatus for producing carbon black which uses filter bag off-gas as a quench fluid for controlling the temperature of the hot combustion gases introduced into the reaction zone. Another object is to provide an apparatus for producing carbon black which includes control means for controlling the amount of quench fluid introduced into a combustion zone in response to temperature of the hot combustion gases produced in the combustion zone. Another object is to provide a method of producing carbon black in which no or minimal excess oxygen is introduced into the reaction zone and thereby substantially prevent oxidation of the make-hydrocarbon. Another object is to provide a method of producing carbon black which uses filter off-gas as a portion of the fuel used to produce hot combustion gases used to pyrolyze the make-hydrocarbon. Another object is to provide a method of producing carbon black which insures complete combustion of fuel used to make hot combustion gases. Another object is to provide a method of producing carbon black in which the amount of quench fluid introduced into a combustion zone to control the temperature of hot combustion gases is controlled in response to the temperature of the hot combustion gases entering the reaction zone.

Other objects and advantages of the present invention will become apparent from the following detailed description taken in connection with the accompanying drawings wherein are set forth by way of illustration and example, certain embodiments of this invention.

FIG. 1 is a schematic representation of an apparatus used for producing carbon black.

FIG. 2 is a sectional view taken along the line 2—2, FIG. 1 of the carbon black reactor.

Figure 3:
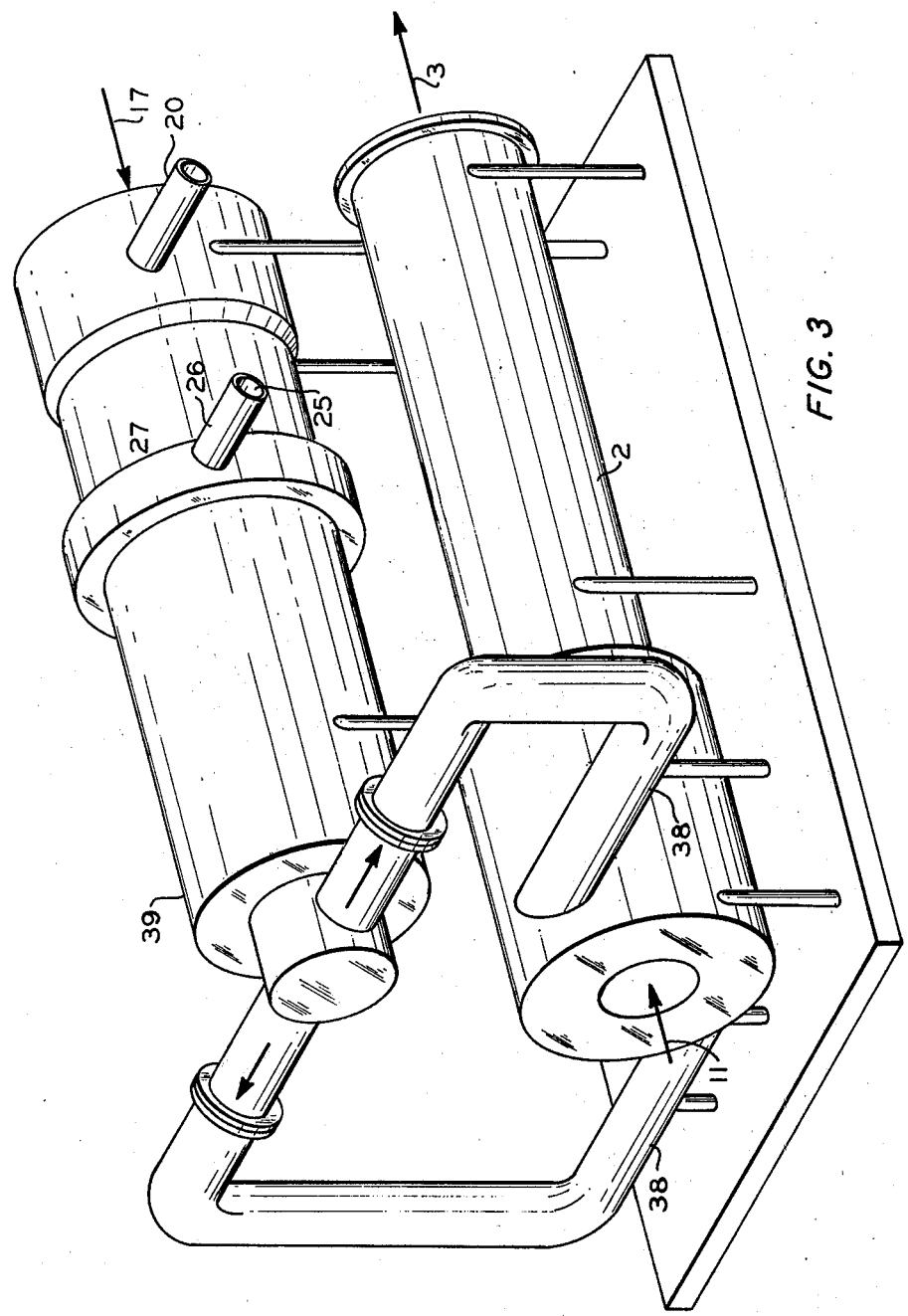
FIG. 3 is a perspective view of a second embodiment of the present invention.

The reference numeral 1 designates generally a carbon black producing apparatus which includes a reactor 2. The reactor 2 has an outlet 3 from which carbon black particle containing smoke, effluent or gas is coducted via a conduit 5 to separating means 6 for separation of the carbon black particles from the gaseous portion of the effluent. Preferably, a heat exchanger 7 is connected in the conduit 5 and is operable for cooling the reactor effluent before it enters the separating means 6 such as a bag filter. The carbon black particles separated by the separating means are discharged by an outlet 8. The separated gaseous portion, also called off-gas, can be recycled as a combustion gases quench fluid as later described either totally or partially and any unrecycled portion can be discharged from the process via a discharge 9 and be controlled by a flow control valve 13 which may be either manual or automatic. An off-gas from a companion reactor can be used as the quench gas for the hot combustion gases.

The reactor 2 can be of any suitable type having a reaction chamber or zone 10 therein in which the pyrolysis to carbon black particles of make-hydrocarbon introduced via inlet means 11 is accomplished. A venturi reaction zone can be used. Reactors of this general type are known in the art and are more fully disclosed as, for example, in U.S. Pat. No. 2,564,700. Means 12 is provided for producing hot combustion gases and introducing the produced hot combustion gases into the reaction zone 10 preferably in a generally tangential manner, with respect to the reaction zone 10, so as to effect vortex flow of the gases along the length of the reaction zone 10. The hot combustion gases introduced from the means 12 contact the make-hydrocarbon at a temperature sufficiently high to pyrolyze the make-hydrocarbon to carbon black particles. After a predetermined length of reaction time, depending mainly on desired photelometer, the effluent flowing along the reaction zone 10 is quenched by contact with a quench fluid introduced via quench inlet means 14 which is connected to a suitable source of quench fluid such as water and/or cooled smoke. In the illustrated structure the quench fluid is supplied from off-gas from the separating means 6 via a conduit 15. The quench fluid can also include a portion of the cooled smoke recovered downstream of heat exchanger 7 via conduit 15' upstream of the separation means 6. It is to be noted that other sources of quench fluid can be used as, for example, water can be used as the quench fluid. However, the use of cooled smoke from the conduit 15' is desirable in that the separating means, which preferably is a bag filter, is not required to handle the large amounts of water vapor which would be produced if water is used as the quench fluid.

The combustion means 12, in the illustrated structure, is in a plurality; however, it is to be understood that any quantity of one or more can be provided as is dictated by the requirements of a particular process and reactor. The discussion of one combustion means 12 applies to the other combustion means 12 if a plurality is provided. A refractory lined housing 15 defines a combustion chamber or zone 16 (FIG. 2) which opens into the reaction zone 10 in a generally tangential direction so as to provide the desired vortex flow of the combustion gases within the reaction zone 10. Combustible fuel is introduced into the combustion zone 16 from a suitable source (not shown) via an inlet or injector 17. The inlet 17 includes a nozzle 17' on the free end thereof and preferably is directed generally along the longitudinal axis of the combustion zone 16. Any suitable combustible fuel can be used such as methane, natural gas, heating oils #2 through #6, and the like. An oxygen-containing gas such as air is also introduced into the combustion zone 16 and preferably is introduced in a manner so that the air flows in a generally vortex path along the combustion zone 16. Other methods of oxygen containing gas introduction can also be employed. As best seen in FIG. 2, the air is introduced into a chamber or zone 19 through generally tangentially directed, with respect to the chamber 19, conduits 20. The air then flows into the combustion zone 16, preferably after first passing through a venturi 21. The chamber 19 has a diameter larger than that of the throat of the venturi 21. The ratio of oxygen-containing gas via conduits 20 to fuel via inlet 17 is preferably in the excess oxygen range, e.g., about 120% to about 160% of stoichiometric oxygen and depends on the amount of combustible fuel in the quench off-gas.

In a preferred embodiment of the present invention, the combustion zone 16 has a diameter larger than that of the throat of the venturi 21 to provide a lower flow velocity of the material passing therethrough than the flow of material through the throat of venturi 21. The large section 22 has a diameter of between about 1 to 10 times the diameter of the throat of a venturi 23 in the reaction zone 10. More preferably the diameter is 2 to 8 times the venturi 23 throat diameter. The enlarged section 22 terminates at a venturi 22' which provides communication between the reaction zone 10 and enlarges section 22. The length of the combustion zone 16 is the spacing between the throats of the venturies 22' and 21 and will depend upon the type of combustible fuel injected via the inlet 17 and preferably is between about 4 to 16 times the diameter of the throat of the venturi 23.

Quench fluid inlet or injection means 25 opens into the combustion zone 16 and is operable for introducing quench fluid into the combustion zone 16. As shown, the quench fluid inlet means 25 includes a plurality of flow passages or conduits 26 opening into the combustion zone 16 in a direction whereby the quench fluid introduced is preferably directed in a generally tangential manner with respect to the combustion zone 16, either counterrotational or corotational, to the introduction of air through the conduit 20. However, other directions of introduction such as generally radial can also be used. Counterrotational and radial introduction of quench fluid forms an admixture of the quench fluid and hot combustion gases thereby lowering the temperature of the hot combustion gases. Corotational introduction of quench fluid at least initially forms a sheath of quench fluid around the hot combustion gases and thereby protects the refractory. The inlet means 25, as shown, includes a housing 27 which surrounds a portion of the housing 15 and is suitably connected to a source of quench fluid later described. The housing 27 forms a manifold through which the quench fluid flows to each of the conduits 26.

It is preferred that the diameter of the throat of the venturi 21 be about $\frac{1}{2}$ to $1\frac{1}{2}$ times the diameter of the throat of reactor venturi 23, and that also the diameter of the outlet of venturi 22' be about 1 to $2\frac{1}{2}$ times the diameter of the throat of venturi 23. Further, it is preferred that the position of the conduits 26 be downstream of the nozzle 17' and throat of the venturi 21 and upstream of the venturi 22' and preferably about 1 to 10 diameters and more preferably about 2 to 8 diameters of the diameter of throat of venturi 21 from the downstream wall of the chamber 19. Further, it is preferred that the diameter of a reaction zone section 40 where the hot combustion gases enter be about 2 to 7 times the diameter of the throat of the venturi 23.

Control means 28 (FIG. 1) is provided for regulating the flow of quench fluid into the combustion zone 16. In the illustrated structure, control means 28 includes a temperature sensing device such as thermocouple 29 in temperature sensing relation with the combustion zone 16 preferably at a point between the conduits 20 and the venturi 22'. The thermocouple 29 is operably connected to a temperature regulator controller 30 which in turn is operably connected to a flow control valve 31 for regulating the input rate of quench fluid in response to the measured temperature of the hot combustion gases in the combustion zone 16. The valve 31 is connected in a conduit 32 which connects the quench inlet means 25 to a source of quench fluid. It is preferred that the conduit 32 connect the quench fluid inlet means 25 to an off-gas outlet 33 of the separating means 6. If desired, a heat exchanger 34 can be connected in the conduit 32 for cooling the off-gas used as quench fluid to a desired temperature if the off-gas is not at a sufficiently low temperature.

In the practice of the present invention the oxygen-containing gas, e.g., air, introduced via the conduit 20 can be between about 80 percent and about 150 percent or higher and preferably between about 80% and about 105 percent and more preferably about 100 percent stoichiometric oxygen required for the fuel introduced and the combustible portion of the quench fluid injected into the combustion zone via the inlets 17 and 25. To produce certain types of carbon black, it is desirable to have excess oxygen such that partial oxidation of the make hydrocarbon results. The temperature of the hot combustion gases is held below a temperature which would damage portions of the reactor but the temperature is still sufficiently high to achieve pyrolysis of the make hydrocarbon. The refractory is normally damaged by high temperature in an area adjacent to and downstream of the venturi 22' or outlet of the combustion zone 16. Refractory damaging temperature is the temperature at which softening occurs or the temperature at which spalling can be caused. For example, if the refractory is 90 percent alumina, the temperature of the hot combustion gases should be held below about 3100° F. for continuous operation. If the refractory is chrome alumina, then the hot combustion gas temperature should be held below about 3300° F. for continuous operation. The temperature of the air entering via the conduits 20 and the temperature of the fuel entering via the inlet 17 will be dependent upon the particular process used and generally would be between about 100° F. and 1200° F. for the air and 100° F. to 700° F. for the fuel. The temperature of the quench fluid entering the combustion zone 16 preferably is below about 500° F. and the quench fluid preferably has an oxygen content of less than about 0.5% by volume.

To illustrate the present invention, the following calculated example is provided using a reactor having a diameter of 8 inches for the throat of venturi 23:

| Example for N220 | |
|---|---|
| Combustion Zone: | |
| Total Tangential Air/ SCF/hour, | 250,000 |
| Air Preheat, °F., | 900 |
| Total Fuel Oil, gallons/hr., | 100 (total) |
| (Number 2 Fuel Oil) | 50 (ea. side for 2 sides) |
| Fuel Oil Temperature, °F., | 500 |
| Air/Fuel Oil Ratio SCF/gal | 2500 |
| Total Filter Off-Gas Added From a Separate N550 Reactor, SCF/hr., | 120,000 |
| Off-Gas Temperature, °F. | 450° F. |
| Composition, Vol. % | |
| $H_2O$ — 10.2 | |
| CO — 13.4 | |
| $CO_2$ — 3.9 | |
| $H_2$ — 14.1 | |
| $N_2$ — 57.9 | |
| $C_2H_2$ — 0.5 | |
| 100.0 | |
| Reaction Zone: | |
| Make Oil, Gallons/hr., | 250 |
| BMCI | 125 |
| API @ 60° F., | −1.0 |
| Axial Air, SCF/hour | 4000 |
| 500° F. Prequench Smoke @ 40 inches downstream of reactor inlet SCF/hr. | 75,000 |
| 500° Final Quench Smoke @60 inches downstream of reactor inlet, SCF/hr. | 75,000 |
| Carbon Black Product (N220): | |
| (1) $N_2SA$, $M^2$/gm, | 125 |
| (2) CTAB, $M^2$/gm, | 116 |
| (3) 24M4 DBP, cc/100 gm, | 95 |
| (4) Photelometer (toluene) | 80+ |
| (5) Tinting Strength | 125 |
| (6) 300% Modulus | +250 |
| (7) Pound Carbon Black/gal. make oil | 4.4 |
| (1) ASTM D3037-71T, Method A; | |
| (2) Janzen, J. and Kraus G., Rubber Chemistry and Technology, 44, 1287 (1971); | |
| (3) ASTM D3493-76; | |
| (4) ASTM D1618-58T; | |
| (5) ASTM D3265-75; | |
| (6) ASTM D3191-75. | |
| (7) When hot combustion gases contain free oxygen (150% stoichiometric air), the pounds of N220 carbon black per gallon of the same make oil is about 4.1. | |

FIG. 3 illustrates a second embodiment of the present invention wherein like reference numerals designate like or similar parts or structure as designated for the form of the invention shown in FIGS. 1 and 2. There is connected to the reactor 2 one or more combustion gas inlets 38 which are generally tangentially directed as are the means 12. The combustion zone 16 is within a housing 39 which is in flow communication with the inlets 38. Preferably the housing 39 and the longitudinal axis of the combustion zone 16 therein is positioned parallel to the longitudinal axis of the reaction zone in the reactor 2 and is positioned above the reactor 2. This permits the use of an elongate combustion zone which provides a long burning time, and thereby more complete combustion before the hot combustion gases enter the reactor 2 via the inlets 38. Quench fluid is introduced into the combustion zone 16 via the quench fluid inlet 25 and the conduit 26 via the housing 27. Air is introduced into the combustion zone 16 through the conduit 20. Combustion fuel is added via conduit 17. In the form illustrated, the inlets 38 are generally U-shaped, however, the inlet conduits can take other forms.

The embodiment of the invention shown in FIG. 3 is particularly advantageous for use in existing carbon black facilities in which the reactors are spaced close together and side by side. Such an arrangement of inlet conduits 38 and housing 39 allows elongate combustion zones to be used without interferring with an adjacent reactor.

It is to be understood that while there has been illustrated and described certain forms of this invention, it is not to be limited to the specific form or arrangement of parts herein described and shown except to the extent that such limitations are found in the claims.

What is claimed and desired to be secured by Letters Patents is:

1. A method of producing carbon black comprising:
    introducing a combustible fuel into a combustion zone which is defined by refractory;
    introducing an oxygen-containing gas into said combustion zone in a quantity greater than stoichiometric oxygen required for combustion of the combustible fuel;
    combusting said fuel and said oxygen-containing gas in said combustion zone to therby produce hot combustion gases;
    introducing a quench fluid into said combustion zone, at a position downstream of the position of the introduction of said combustible fuel into said combustion zone, in a quantity sufficient and in a manner to prevent said hot combustion gases from heating said refractory to a refractory damaging temperature, said quench fluid including at least a portion of smoke produced by a carbon black producing process and containing combustible material to form additional hot combustion gases;
    combusting said combustible materials utilizing substantially the remainder of the oxygen in the oxygen-containing gas whereby the hot combustion gases and quench fluid are substantially free of free oxygen;
    introducing the thus produced hot combustion gases and quench fluid into a reaction zone in a generally tangential manner with respect to the reaction zone;
    contacting in the reaction zone a make hydrocarbon and the thus introduced hot combustion gases and quench fluid, thereby heating the make hydrocarbon to a temeperature sufficiently high to decompose the make hydrocarbon to carbon black, thereby forming smoke containing carbon black; and
    separating the thus produced smoke into carbon black and off gas.

2. A method as set forth in claim 1 wherein:

said quench fluid is introduced into said combustion zone in a generally tangential manner at a position downstream of the position of the introduction of said combustible fuel.

3. A method as set forth in claim 1 wherein:
the quantity of said oxygen-containing gas provides between about 80 and about 105 percent of the stoichiometric oxygen required for combustion of said combustible fuel and of said combustible material.

4. A method as set forth in claim 1 wherein:
said quench fluid includes a portion of said smoke produced in said reaction zone.

5. A method as set forth in claim 4 wherein:
said quench fluid has an oxygen content of less than about 0.5% by volume.

6. A method as set forth in claim 4 wherein:
said portion of smoke is at a temperature of less than about 500° F. immediately prior to the introduction into said combustion zone.

7. A method as set forth in claim 2 wherein:
said refractory damaging temperature is about 3500° F.

8. A method as set forth in claim 2 wherein:
said oxygen-containing gas is introduced into said combustion zone in a generally tangential manner at a position upstream of the point of introduction of said quench fluid.

9. A method as set forth in claim 2 wherein:
said hot combustion gases flow, at least initially, in a vortex manner in said combustion zone; and
said quench fluid is introduced into the combustion zone in a direction generally corotational with the vortex flow of the hot combustion gases.

10. A method as set forth in claim 2 wherein:
said hot combustion gases flow, at least initially, in a vortex manner in said combustion zone; and
said quench fluid is introduced into the combustion zone in a direction generally counterrotational to the vortex flow of the hot combustion gases.

11. A method as set forth in claim 1 wherein:
said quench fluid is introduced into the combustion zone in a generally radial direction.

12. A method as set forth in claim 1 wherein:
said quench fluid is introduced into the combustion zone in a plurality of streams.

13. A method as set forth in claim 1 wherein:
there is a plurality of such combustion zones each having combustible fuel, oxygen-containing gas and quench fluid introduced thereinto.

14. A method as set forth in claim 1 wherein:
at least a portion of said thus separated off-gas is used for at least a portion of said quench fluid.

* * * * *